UNITED STATES PATENT OFFICE 2,664,432

HETEROCYCLIC METAL AND SULFUR ORGANIC COMPOUNDS

Ernst A. H. Friedheim, New York, N. Y.

No Drawing. Original application January 28, 1947, Serial No. 724,925. Divided and this application September 19, 1951, Serial No. 247,369

4 Claims. (Cl. 260—440)

This invention relates to organometallic compounds containing radicals of arsenic or antimony and has particular relation to organometallic compounds of this type in which the radicals of arsenic or antimony are linked to sulfur-containing organic radicals. The invention also relates to methods of preparing such compounds.

The main object of the present invention consists in providing organometallic compounds containing radicals of arsenic or antimony, which show valuable therapeutical properties.

Another object of my present invention is to provide organometallic compounds of the above-mentioned type which yield injectable, stable solutions.

Other objects and the advantages of the invention will be apparent from the following specification and claims which show, by way of example, some preferred embodiments of the invention.

Therapeutically useful organometallic compounds of arsenic and antimony in which the arsenic atom or antimony atom is linked to form the grouping

and in which each of the two sulfur atoms is part of an individual —SR radical (mercaptan residue) have been known. These compounds correspond to the general formula $$Ar.Me=(SR)_2 \quad (I)$$

wherein Ar is an organic radical, Me stands for an atom of trivalent arsenic or antimony, and SR is the residue of an organic sulfhydril compound.

The therapeutically useful organometallic compounds, according to the present invention, contain radicals of trivalent arsenic and antimony in which the arsenic atom or antimony atom is linked to two sulfur atoms which are substituents of the same organic radical, said organometallic compounds corresponding to the general formula $$Ar.Me=S_2R' \quad (II)$$

I have found that compounds of the above shown general structure (II) have outstanding chemotherapeutic, for example, trypanocidal activity, combined with relatively low toxicity. Furthermore, such compounds are distinguished by their stability. According to the nature of the dimercapto compound used, the final product may have special properties of solubility which are highly desirable from the angle of practical medicine. For example, the combination of certain phenylarsenic and phenylantimony compounds with 2,3-dimercaptopropanol leads to compounds yielding stable solutions in propylene glycol, while their combination with 2,3-dimercaptopropionic acid leads to water-soluble compounds.

The general method for the preparation of compounds forming the subject of this invention consists of mixing a suitable dimercapto compound with dispersion or solution of an organometallic compound containing trivalent antimony or arsenic linked to a carbon atom. The combination takes place, as a rule, rapidly at room temperature according to the following scheme:

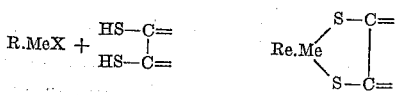

In the above scheme R is an organic radical and —MeX stands for a radical of trivalent arsenic or antimony, which is capable of reacting with the dithiol used. For example, —MeX may stand for —As=Cl$_2$, —As=O,

—SbCl$_2$, —SbO, and antimony thiomalate radicals.

The organometallic compound may also be put to the reaction in the pentavalent state, provided conditions are such as to bring about in the reaction mixture a reduction to the trivalent state. This may be obtained by using an appropriate excess of the dimercapto compound which will act as a reducing agent.

If an aqueous reaction medium is used in a reaction with a dimercapto compound, it is preferable to adjust the pH of the reaction mixture to 6 to 8. The reaction may also be carried out in a non-aqueous medium, for example in alcoholic or glycol solution.

Another procedure to obtain compounds corresponding to the present invention consists in first forming a compound of the formula

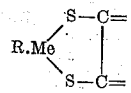

and further reacting the compound thus obtained with another suitable organic compound. For example a compound of the formula

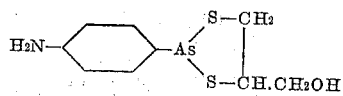

may be first prepared in the manner described in detail hereinafter and the compound formed may be reacted with a suitable 1,3,5-triazine halogen derivative to form a compound corresponding to the formula

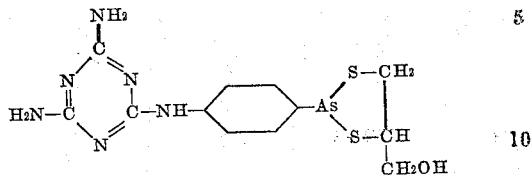

The compounds forming the object of this invention have the following group properties:

The nitroprusside reaction for —SH groups is negative or only very faintly positive under classical condition, i. e. in the presence of sodium carbonate at a pH of about 8, but becomes positive on addition of caustic alkali, such as NaOH, i. e. at a pH of at least 9–10.

The procedure of the preparation of the compounds embodying the present invention will become more apparent from the following examples:

*Example 1.*—36.4 millimols of sodium p-melaminylphenylstibonate (I) are suspended in 100 ml. of water, and to this suspension 218 millimols of ammonium thioglycolate, i. e. approximately 6 equivalents based on the amount of (I), are added in concentrated (50–58%) aqueous solution. The reaction mixture is stirred at room temperature for 10 minutes to form a nearly clear, slightly brownish solution having a pH of about 9.

The pH is adjusted to 6.5–7 by addition of 27 ml. of 20% aqueous acetic acid. The reaction mixture is filtered and the clear filtrate is diluted with 200 ml. of water. 40 millimols, i. e. 10% excess of the theory, of 2,3-dimercaptopropanol (II), dissolved in 20 ml. of ethanol, are added with rapid stirring to the reaction mixture. A white precipitate is formed immediately, filtered off, washed with 500 ml. of water, 250 ml. of ethanol and 250 ml. of ether. The washed precipitate is dried in vacuo over sulfuric acid. The yield amounts to 92% of the theory.

The product thus obtained is insoluble in water, alcohol and ether. It is soluble in propylene glycol to at least 10%. This solution is stable to heating at a temperature of 80° C. for at least 3 weeks. The product sinters at 175° C. and melts with decomposition between 175° and 200° C. The aqueous suspension of the substance reduces Fehling solution slowly on heating. The nitroprusside reaction for —SH groups is negative to faintly positive in the presence of sodium carbonate, i. e. at a pH of about 8, but becomes strongly positive on addition of 10% aqueous sodium hydroxide, i. e. at a pH of at least 9–10.

The maximum tolerated dose in mice, i. p., of the substance administered in propylene glycol solution, amounts to 0.03 g./kg., while the minimum curative dose, i. p., in the T. *equiperdum* infection of the mouse amounts to 0.0006 g./kg., in propylene glycol solution. Thus, the therapeutic index amounts to 50.

Formation of the above described substance apparently takes place according to the following scheme:

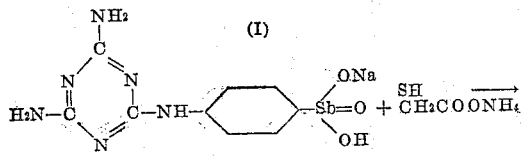

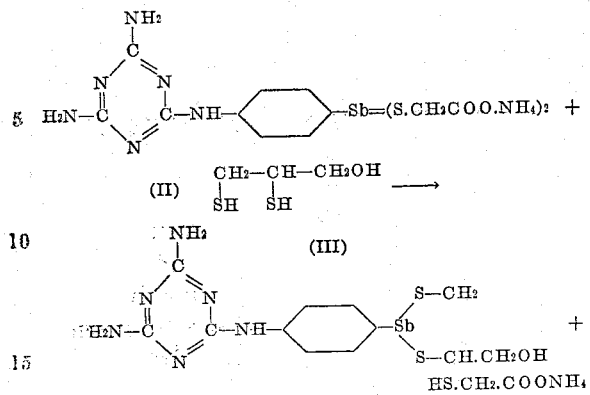

The same product (III) may also be obtained by converting compound (I) into the corresponding derivative containing the —Sb=O radical by reduction and reacting an aqueous suspension of the reduced compound at substantially neutral reaction with the necessary amount of compound II.

*Example 2.*—1/100 mol of the hydrochloride of 3-amino-4-hydroxyphenyl arsenoxide are dissolved in 48 ml. of water and enough sodium carbonate to form a clear solution having a pH of 6.0. With rapid stirring 1.1 ml. of 2,3-dimercapto-propanol (11 millimols) are added. A whitish, gluey precipitate is formed, which changes to a granular white powder upon adjusting the pH to 7.5 and continuing stirring for half an hour. The precipitate is filtered off and washed abundantly with distilled water.

The product thus obtained has the formula (IV) 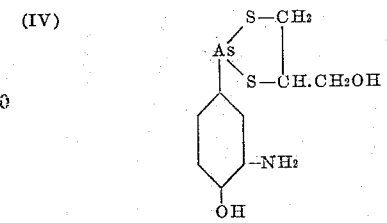

It is insoluble in water, readily soluble in cold acetone and cold ethanol, and sparingly soluble in cold methanol. It can be recrystallized from boiling methyl alcohol. In order to effect such recrystallization, it is dissolved in 40 ml. of boiling methanol, and the slightly turbid solution is filtered. On cooling the clear filtrate, a snow-white crystalline precipitate of (IV) is formed, filtered off, washed with methanol and ether, and dried in vacuo. The compound as well as its hydrochloride salt is soluble in propylene glycol. Such solution of the salt is distinguished by good stability.

*Example 3.*—1/10 mol of 3-(2',4'-diamino-1',3',5'-triazinyl-6')-amino-4-hydroxyphenylarsendichloride of the formula

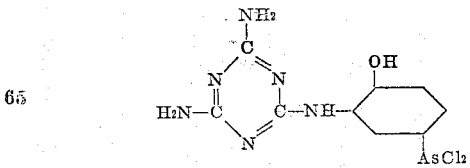

prepared as described in my U. S. Patent No. 2,386,204, is suspended in 50 times its weight of water with the addition of 2/10 mols of sodium carbonate and to the reaction mixture 11 ml. (110 millimols) of 2,3-dimercaptopropanol are added with vigorous stirring. Stirring of the reaction mixture is continued for ½ hour. The resulting precipitate is filtered off, washed with water and dried in vacuo.

The product formed has the structural formula

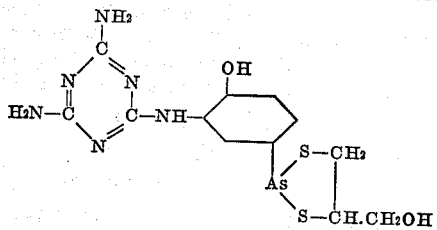

It is insoluble in cold water, and soluble in propylene glycol.

*Example 4.*—1/10 mol of p-aminophenyl arsendichloride of the structural formula

prepared according to known methods, is suspended in 40 times its weight of water and 1/10 mol of sodium carbonate, and 11 ml. (110 millimols) of 2,3-dimercapto-propanol are added with vigorous stirring. Stirring is continued for 45 minutes. The precipitate formed, which is filtered off and washed with water, corresponds to the formula

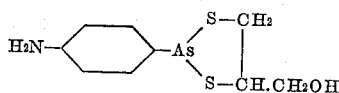

It yields injectable solutions in propylene glycol and is soluble in dilute hydrochloric acid.

*Example 5.*—1/10 mol of 3-acetylamino-4-hydroxy-phenyl-arsenoxide of the formula

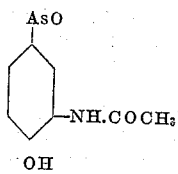

is suspended in 60 times its weight of water, and to the reaction mixture 11 ml. (110 millimols) of 2,3-dimercaptopropanol, dissolved in methanol, are added with vigorous stirring. Stirring of the reaction mixture is continued for 60 minutes. A light tan precipitate is formed, which is filtered off and washed with water.

The reaction product formed has the structural formula

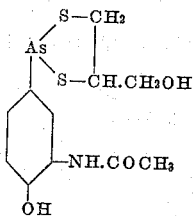

The starting material used in this example is prepared by reduction of 3-acetylamino-4-hydroxyphenylarsonic acid according to classical methods with sulfur dioxide in the presence of catalytic quantities of hydriodic acid.

*Example 6.*—1/10 mol of 2-hydroxy-4-acetylamino-benzene-arsendichloride of the formula

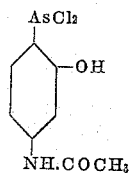

is suspended in 50 times its weight of water, and to the suspension 2/10 mols of sodium carbonate and 11 ml. (110 millimols) of 2,3-dimercaptopropanol are added with rapid stirring. The resulting precipitate is filtered off, washed with water and dried in vacuo.

The reaction product thus formed has the structural formula

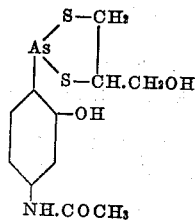

The compound is insoluble in water, soluble in propylene glycol, ethylene glycol, glacial acetic acid, and hot ethanol.

*Example 7.*—30 millimols of the monosodium salt of 4-carbamido-phenylarsonic acid of the formula

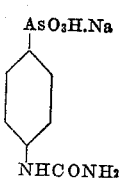

are suspended in 400 ml. of water, and a concentrated (50%) aqueous solution of 180 millimols of ammonium thioglycolate is added. The reaction mixture is stirred in an inert atmosphere at a temperature of 80° C., for 60 minutes. To the resulting solution are added dropwise with rapid stirring 33 millimols of 2,3-dimercapto propanol. A white precipitate separates from the solution, which is filtered off, washed with water, and dried in vacuo.

The compound formed corresponds to the formula

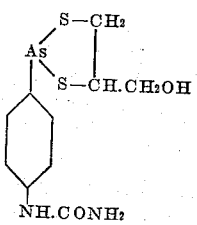

The compound is insoluble in water, chloroform and ether, soluble in propylene glycol.

*Example 8.*—36.4 millimols of sodium N-phenyl-glycine-amide-p-arsonate of the formula

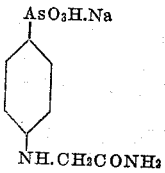

are dissolved in 500 ml. of water. To this solution a 20% aqueous solution of 218 millimols of sodium thiomalate is added, and the reaction mixture is stirred at a room temperature for 60 minutes in an inert atmosphere. To the resulting solution 40 millimols of 2,3-dimercaptopropanol dissolved in 20 ml. of ethanol are added with rapid stirring. The whitish precipitate formed is filtered off, and washed with water.

The compound formed has the following structural formula:

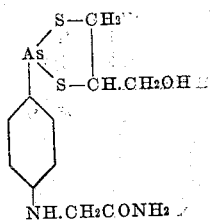

It is insoluble in water and soluble in propylene glycol.

*Example 9.*—36.4 millimols of the monosodium salt of 4-hydroxypropylaminophenyl-1-arsonic acid of the formula

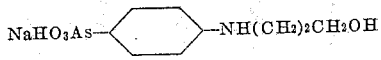

are added to a solution of 218 millimols of ammonium thioglycolate in 500 ml. of water. The reaction mixture is heated at 80° with stirring in an inert atmosphere for 45 minutes. To the resulting solution of 40 millimols of 2,3-dimercaptopropanol, dissolved in 20 ml. of ethanol, are added with vigorous stirring. A precipitate is formed, which is filtered off, washed with water and dried in vacuo.

This precipitate consists of a compound of the following formula:

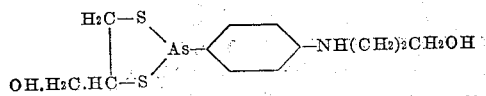

If in the above example instead of the sodium salt of 4-hydroxypropylaminophenyl-1-arsonic acid, an equivalent amount of the monosodium salt of 4-hydroxyethylaminophenyl-1-arsonic acid is used under otherwise similar conditions, a compound corresponding to the following formula is obtained:

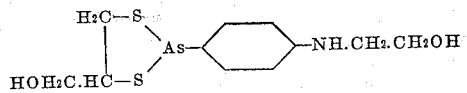

The product is insoluble in water. It is soluble in propylene glycol and hot ethanol.

*Example 10.*—To a 5% aqueous solution containing 50 millimols of sodium p-aminophenylstibonate of the formula $H_2N.C_6H_4.SbO(OH)(ONa)$ a 20% aqueous solution of 300 millimols of potassium thioglycolate are added at room temperature with rapid stirring, which is continued for about 1 hour. To the resulting clear solution 55 millimols of 2,3-dimercaptopropanol, dissolved in 20 ml. of ethanol are added with constant vigorous stirring. The reaction product separates from the solution in form of a brownish gummy precipitate which is filtered off, and washed with water. The compound formed has the formula

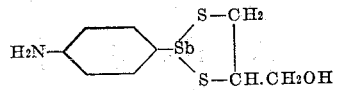

It is insoluble in water but soluble in propylene glycol and sulfuric acid.

*Example 11.*—To a 2% aqueous solution containing 40 millimols of the sodium acetylaminophenylstibonate of the formula $CH_3.CO.NH.C_6H_4SbO(OH)(ONa)$ a 55% aqueous solution containing 240 millimols of ammonium thioglycolate are added at room temperature with rapid stirring. The stirring is continued for 30 minutes. To the resulting solution 45 millimols of 2,3-dimercaptopropanol are added with vigorous stirring. A precipitate is formed, which is filtered off and washed with water. The compound formed has the formula

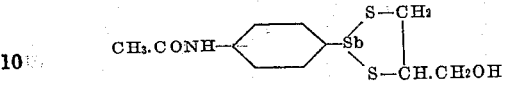

It is insoluble in water. Injectable solutions may be prepared by dissolving the product in warm propylene glycol.

A compound of the formula

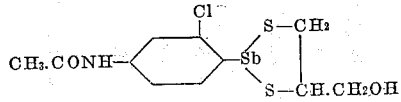

may be obtained by a procedure substantially identical with that described above, if an equivalent amount of sodium 3-chloro-4-acetylaminophenylstibonate is substituted for the monosodium-p-acetylaminophenylstibonate in the above example.

*Example 12.*—36.4 millimols of the disodium salt of di-[p-aminophenylsodiumstibonate]-urea, of the formula

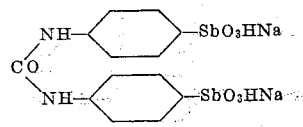

are added to a solution of 218 millimols of sodium thioglycolate in 1 liter of water with rapid stirring at room temperature. The stirring is continued for 30 minutes. To the solution thus formed, 80 millimols of 2,3-dimercaptopropanol are added dropwise with rapid stirring. A precipitate is formed which is filtered off and washed with water.

The reaction produce formed has the formula

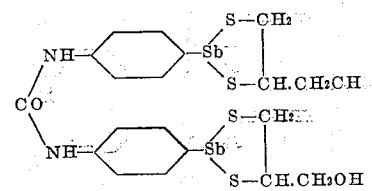

The product is insoluble in water, but soluble in propylene glycol.

*Example 13.*—To 1/10 mol of p-aminophenylarsenoxide of the formula

suspended in 1 liter of water are added 110 millimols of 2,3-dimercaptopropanol dissolved in 50 ml. of ethanol with rapid stirring. Stirring is continued for 1 hour. The resulting product has the formula

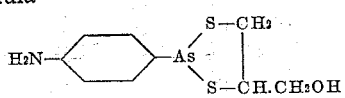

This product, which is identical with that obtained in Example 4, is washed with water and is then reacted with an aqueous suspension of 1/10 mol of 2,4-diamino-6-chloro-1,3,5-triazine with stirring at a temperature of 100° C. at a pH of 2-4.

The resulting reaction product corresponds to the formula

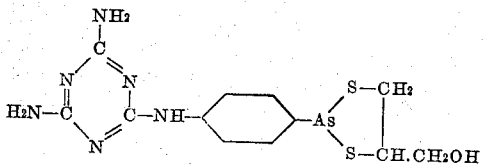

It is insoluble in water, cold ethanol and methanol, but soluble in propylene glycol.

*Example 14.*—1/10 mol of a compound corresponding to the formula

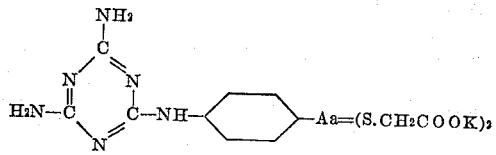

prepared in the manner described in my U. S. Patent No. 2,422,724 patented June 24, 1947, is dissolved in water and to the solution 110 millimols of 2,3-dimercaptopropanol are added with rapid stirring at ordinary room temperature. Stirring is continued for 20 minutes and the precipitate formed is filtered off, and washed with water. The compound thus formed is identical with that obtained in Example 13.

*Example 15.*—1/10 mol of p-hydroxyphenyl arsenoxide of the structural formula

is suspended in 50 times its weight of water and 11 ml. (110 millimols) of 2,3-dimercaptopropanol are added to the solution with vigorous stirring. After 50 minutes of continued stirring the compound formed is filtered off and washed with water. The reaction product, which is soluble in propylene glycol, corresponds to the formula

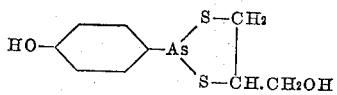

*Example 16.*—36.4 millimols of sodium p-melaminylphenylstibonate are suspended in 100 ml. of water and to this solution 218 millimols of ammonium thioglycolate are added in a 55% aqueous solution. The reaction mixture is stirred at room temperature for 15 minutes to form a solution having a pH of about 9. The pH is adjusted to 6.5–7 by the addition of aqueous acetic acid, the reaction mixture is filtered and the clear filtrate is diluted with 200 ml. of water. 40 millimols of 1,2-propanedithiol are now added to the solution with rapid stirring. A white precipitate is formed which is filtered off, washed with water, and dried in vacuo over concentrated sulfuric acid.

In the above example, equivalent amounts of ethanedithiol (SH.CH₂.CH₂SH) or 2,3-butane dithiol may be substituted for the 1,2-propanedithiol. The dithiols mentioned in this example may be prepared according to the methods described in the U. S. Patent 2,402,643, granted to W. A. Lazier et al.

*Example 17.*—1/100 mol of the hydrochloride of 3-amino-4-hydroxyphenylarsenoxide and the requisite amount of sodium carbonate are dissolved in 48 ml. of water to form a clear solution having a pH of 6.0 To the solution 11 millimols of 1,2-propanedithiol are added with rapid stirring, and stirring is continued for half an hour. A white precipitate is formed which is filtered off and washed with distilled water.

By substituting equivalent amounts of 1,2-ethanedithiol or 2,3-butanedithiol for the 1,2-propane dithiol used in this example, and proceeding in a substantially identical manner, corresponding derivatives containing ethanedithiol and 2,3-butanedithiol, respectively, are obtained.

*Example 18.*—To an aqueous suspension of 36.4 millimols of sodium p-melaminylphenylstibonate in 100 ml. of water, a 55% aqueous solution of 218 millimols of ammonium thioglycolate is added with stirring for about 10 minutes. The pH of the solution is adjusted to 6.5–7 by the addition of dilute aqueous acetic acid. The reaction mixture is filtered and the clear filtrate is diluted with 200 ml. of water. To the diluted solution 40 millimols of 1,3-dithioglycerol are added with rapid stirring. A whitish precipitate is formed which is filtered off, washed with water, and dried in vacuo over concentrated sulfuric acid.

*Example 19.*—To a solution consisting of 1/10 mol of the hydrochloride of 3-amino-4-hydroxyphenylarsenoxide and the requisite amount of sodium carbonate to yield a pH of 6 in 480 ml. of water, 110 millimols of 1,3-dithioglycerol are added with vigorous stirring. A gluey precipitate is formed which changes to a white powder upon adjusting the pH to 7.5 and continued stirring for half an hour. The precipitate is filtered off, washed with water and dried preferably under vacuum in the presence of concentrated sulfuric acid.

*Example 20.*—To a 5% aqueous solution containing 36.4 millimols of sodium p-aminophenylstibonate, a 20% aqueous solution of 218 millimols of potassium thioglycolate are added at room temperature with rapid stirring which is continued for about 30 minutes. 40 millimols of 1,2-propanedithiol are added with vigorous stirring. The resulting precipitate is filtered off, washed with water, and dried under vacuum in the presence of concentrated sulfuric acid.

Analogous compounds may be obtained by substituting equivalent amounts of 1,2-ethanedithiol or 2,3-butanedithiol for the 1,2-propanedithiol used in the above example.

*Example 21.*—100 millimols of p-aminophenyl arsendichloride are suspended in 1 liter of water and 200 millimols of sodium carbonate and 110 millimols of 1,2-propanedithiol are added with vigorous stirring which is continued for 60 minutes. The reaction product formed is filtered off, washed with water, and dried under vacuum.

Analogous compounds may be obtained by proceeding in substantially the same manner as set forth in the above example, by substituting an equivalent amount of 1,2-ethanedithiol or 2,3-butanedithiol for the 1,2-propanedithiol used.

*Example 22.*—36.4 millimols of sodium p-melaminylphenylstibonate are suspended in 100 ml. of water and to this suspension 218 millimols of potassium thioglycolate are added with stirring in 20% aqueous solution. Stirring is continued for 10 minutes and the pH of the reaction mixture is then adjusted to 6.5–7 by the addition of dilute aqueous acetic acid. After filtration, the reaction mixture is diluted with 300 ml. of water and to the diluted solution 40 millimols of 1,2-dimercaptobenzene, dissolved in alcohol, are added with rapid stirring. The precipitate formed is filtered off, and washed abundantly with water. The washed precipitate is dried in vacuo over concentrated sulfuric acid.

*Example 23.*—To an aqueous solution consisting of 36.4 millimols of sodium p-melaminylphenylstibonate and 100 ml. of water, 218 millimols of potassium thioglycolate are added in 20% aqueous solution and the reaction mixture is stirred at room temperature for 10 minutes. The pH is adjusted 6.5–7 by the addition of dilute aqueous acetic acid. The reaction mixture is filtered, the filtrate is diluted with 300 ml. of water and to the diluted liquid 40 millimols of dithio-o-xylylene glycol of the formula $C_6H_4(CH_2SH)_2$, dissolved in alcohol, are added with rapid stirring. A whitish precipitate is formed which is filtered off, washed with water, and dried in vacuo over concentrated sulfuric acid.

*Example 24.*—To a neutral solution prepared by dissolving 100 millimols of the hydrochloride of 3-amino-4-hydroxyphenylarsenoxide and the requisite amount of sodium carbonate in 480 ml. of water, 110 millimols of 1,2-dimercaptobenzene, dissolved in ethyl alcohol, are added with rapid stirring, whereupon a whitish precipitate is formed. Stirring is continued for about half an hour. The precipitate is filtered off, washed with distilled water, and dried, preferably in vacuo in the presence of concentrated sulfuric acid.

*Example 25.*—To a neutral solution prepared by dissolving 100 millimols of the hydrochloride of 3-amino-4-hydroxyphenyl arsenoxide and the requisite amount of sodium carbonate in 480 ml. of water, 110 millimols of dithio-o-xylylene glycol, dissolved in ethyl alcohol, are added with rapid stirring, whereupon a whitish precipitate is formed. Stirring is continued for about half an hour. The precipitate is filtered off, washed with distilled water and dried, preferably in vacuo in the presence of concentrated sulfuric acid.

*Example 26.*—10 millimols of sodium p-melaminyl-phenylstibonate are dissolved in 10 parts by weight of propylene glycol. 22 millimols of 2,3-dimercaptopropanol are added. The resulting solution is poured with stirring into 15 volumes of water. The precipitate which is formed is centrifuged off, washed with water and alcohol and dried in vacuo. The reaction product is identical with the one obtained by the method of Example 1.

For practical therapeutic purposes, it is not necessary to isolate the compound but the solution described above containing in propylene glycol as a solvent the reaction product of sodium p-melaminyl-phenylstibonate and 2,3-dimercaptopropanol in a molar ratio of 1 mol of the former to not less than 2 mols of the latter, can be used directly for parenteral treatment.

*Example 27.*—20 millimols of sodium p-acetyl-aminophenylstibonate are added to a solution of 100 millimols of ammonium thioglycolate in 250 ml. of water. The reaction mixture is stirred for 15 minutes giving a clear solution of pH 9. An alcoholic solution of 22 millimols of dithio-pentaerythritol, prepared according to U. S. P. 2,402,665, is added dropwise with rapid stirring. The resulting precipitate is filtered off, washed with water, and dried in vacuo. The product has the formula:

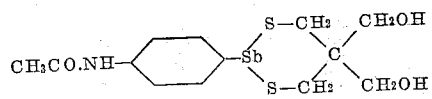

*Example 28.*—To a suspension of 36.4 millimols sodium p-melaminylphenylstibonate in 300 ml. of water are added with stirring 218 millimols ammonium thioglycolate. Stirring is continued for 15 minutes. The pH of the resulting solution is adjusted to 6.5–7 by the addition of aqueous acetic acid. The reaction mixture is clarified by filtration and to the filtrate is added 40 millimols of 2,3-dimercaptopropionic acid. A white precipitate is formed which is filtered off, washed with water, ethanol and ether, and is dried in vacuo. The product has the structure:

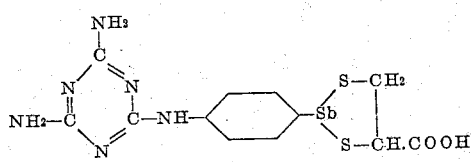

It is insoluble in water, alcohol and ether. It is soluble in water upon addition of sodium carbonate to yield clear, injectable solutions.

*Example 29.*—$\frac{1}{10}$ mol of a compound corresponding to the formula

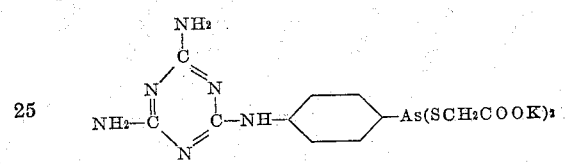

is dissolved in water and to the resulting solution 110 millimols of 2,3-dimercaptopropyl ethyl ether are added with vigorous stirring. A white precipitate forms immediately. It is filtered off, washed with water, and dried in vacuo. The product has the structure:

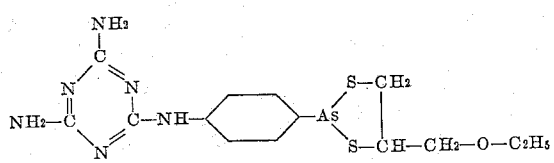

It is insoluble in water, but soluble in propylene glycol on warming.

*Example 30.*—10 millimols of p-aminophenyl-arsenoxide are suspended in enough water to form a 1% suspension. On addition of an aqueous solution of 2,3-dimercaptopropanol-glucoside a clear solution results. By evaporating this solution, first under reduced pressure at a temperature below 35°, and finally in vacuo over concentrated sulfuric acid, a product is obtained which has the following structure:

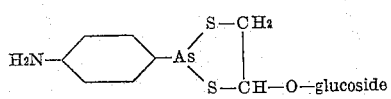

It is insoluble in ether, chloroform, and benzene. It is soluble in water to form injectable solutions.

For practical purposes, it is not necessary to isolate the product, but the solution described above containing, in an aqueous medium, the reaction product of p-aminophenylarsenoxide and an equivalent amount of 2,3-dimercaptopropanol-glucoside is suitable for parenteral administration.

*Example 31.*—To a 5% aqueous solution containing 50 millimols of sodium p-aminophenylstibonate, a 20% aqueous solution of 300 millimols of potassium thioglycolate are added at room temperature with rapid stirring which is continued for one hour. To the resulting solution, 55 millimols of 1,3-disulfhydrylbenzene dissolved in ethanol are added with constant vigorous stirring. The reaction product separates from the solution, is filtered off and washed with water.

*Example 32.*—0.1 mol of sodium arsanilate is dissolved in 50 parts its weight of water. 22 millimols of 2,3-dimercaptopropanol are added, and the reaction mixture is stirred for 40 minutes at 80° in an inert atmosphere. Stirring is continued for 1 hour at room temperature. The precipitate formed is centrifuged off, washed with water and recrystallized out of boiling methanol. The resulting white crystalline product corresponds to the formula

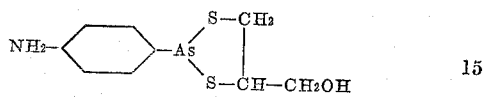

It is insoluble in cold water, soluble in hot alcohol, dilute hydrochloric acid and propylene glycol.

As shown in the above examples, the present invention may be applied to various organometallic compounds and various dithiols in order to obtain new compounds embodying the present invention.

The preferred dithiol used in carrying out the present invention is 2,3-dimercaptopropanol. However other dithiols of aliphatic or aromatic compounds, particularly aliphatic and aromatic orthodithiols, may also be used.

Furthermore, in the above described examples, in which thioglycolates are first reacted with the organometallic compounds, and the reaction products formed are further reacted with dithiols, other thio-acid derivatives, such as thiolactates, may be substituted for the thioglycolates.

It is to be understood that in the present specification and claims the term "amino radical" is used to include —NH$_2$ radicals as well as the above disclosed substituted amino radicals. The abbreviation "i. p." is used in this specification to denote "intra-peritoneal."

It will be apparent from the above description that my invention is not limited to the specific compounds and process steps described above and may be carried out with various modifications without departing from the scope of the invention as defined in the appended claims.

Reference is made to my co-pending application Ser. No. 724,925 filed on January 28, 1947, of which this is a division.

What I claim is:

1. A new organometallic dithio derivative of an amino-phenyl-arsenic compound corresponding to the general formula

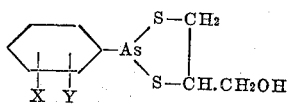

substituted in the benzene ring by at least one of the radicals X and Y, wherein X is selected from the group of H and —OH, and Y is selected from the group of —NH.COCH$_3$, —NH.CONH$_2$, —NH.CH$_2$CONH$_2$.

2. A new organometallic compound of the formula

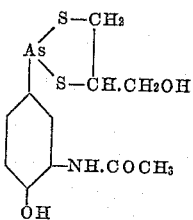

3. A new organometallic compound of the fromula

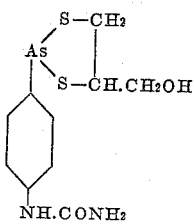

4. A new organometallic compound of the formula

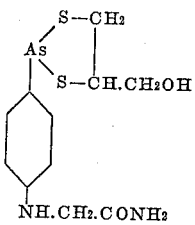

ERNST A. H. FRIEDHEIM.

References Cited in the file of this patent

UNITED STATES PATENTS

| Number | Name | Date |
|---|---|---|
| 1,677,392 | Kharash | July 17, 1928 |
| 2,035,153 | Elger | Mar. 24, 1933 |
| 2,047,275 | Latt | July 14, 1936 |
| 2,209,876 | Ewins et al. | July 30, 1940 |
| 2,226,530 | Brown et al. | Dec. 31, 1940 |
| 2,283,817 | Martin | May 19, 1942 |
| 2,289,878 | Fehrle et al. | July 14, 1942 |
| 2,330,963 | Feinberg | Oct. 5, 1943 |
| 2,386,204 | Freidheim | Oct. 9, 1945 |
| 2,422,724 | Freidheim | Dec. 16, 1947 |

OTHER REFERENCES

Cohen J. Chem. Sec. 1931 part 2 pp. 3043–57.

Powers Advancing Fronts in Chemistry vol. II Chemotherapy, Reinhold Pub. Corp. 1947 pp. 99–100.

Peters et al. Biochemical Journal pp. 53 to 56 1947.

Mann The Chemistry of Heterocyclic Derivatives of Phosphorus, Arsenic Antimony Bismuth and Silicon p. 72 (1950) Interscience Publishers Inc. N. Y. C.

Sandground et al. The Journal of Pharmacology and Experimental Therapeutics vol. 78 No. 2 June 1943 pp. 109–114.